DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 22, 1971

887 O.G. 1047

T887,027
IMAGE TRANSFER PROCESS
Jonas J. Chechak, Brockport, N.Y.
(Kodak Park Works, Rochester, N.Y. 14650)
Filed July 24, 1970, Ser. No. 58,191
Int. Cl. G03g *13/14*
U.S. Cl. 96—1.4
No Drawing. 13 Pages Specification

A method of forming transferred liquid developed electrostatic images includes the steps of forming an electrostatic charge pattern on a charge-bearing member, applying to said pattern a liquid developer containing a mordantable, water-soluble acid dye salt to form a developed image, substantially drying said image and contacting the visible dry image with a moist receiver sheet having coated thereon a layer containing a mordant having a strong affinity for said dye so that the dye is thereby insolubilized before wandering of the dye can occur.